United States Patent
Chuang et al.

(10) Patent No.: US 6,694,302 B2
(45) Date of Patent: Feb. 17, 2004

(54) SYSTEM, METHOD AND ARTICLE OF MANUFACTURE FOR PERSONAL CATALOG AND KNOWLEDGE MANAGEMENT

(75) Inventors: Shu-Min Chuang, Taipei (TW); Sen-Yann Tseng, Taipei (TW); Chi-Hung Chang, Taipei (TW)

(73) Assignee: Learning Digital.com Inc., Taipei (TW)

( * ) Notice: Subject to any disclaimer, the term of this patent is extended or adjusted under 35 U.S.C. 154(b) by 357 days.

(21) Appl. No.: 09/748,859

(22) Filed: Dec. 28, 2000

(65) Prior Publication Data

US 2002/0049686 A1 Apr. 25, 2002

(30) Foreign Application Priority Data

Oct. 20, 2000 (TW) .......................... 89122082 A

(51) Int. Cl.[7] .......................... G06F 17/00; G06F 12/00
(52) U.S. Cl. .......................... 706/46; 707/205
(58) Field of Search .......................... 706/46; 707/205

(56) References Cited

U.S. PATENT DOCUMENTS 6,477,528 B1 * 11/2002 Takayama .................. 707/5

* cited by examiner

*Primary Examiner*—George B. Davis
(74) *Attorney, Agent, or Firm*—Arent Fox Kintner Plotkin & Kahn PLLC

(57) ABSTRACT

The present invention provides a system, method and article of manufacture for personal catalog and knowledge management. The system includes a data collection module for collecting data from a visible data source, a data classification module for classifying the data, a data commentary module for adding value to the data and for providing comment on the data, and a data access module for accessing the data in a storage device. The present invention avoids disadvantages of lacking effective management for personal massive information and can be applied in various data sources. The information can be effectively transferred to personal useful knowledge and further managed by data classification and adding value to the data.

30 Claims, 12 Drawing Sheets

SYSTEM, METHOD AND ARTICLE OF MANUFACTURE FOR PERSONAL CATALOG AND KNOWLEDGE MANAGEMENT

BACKGROUND OF THE INVENTION

1. Field of the Invention

The present invention relates to a personal catalog and knowledge management system, method and article of manufacture and, more particularly, relates to a personal catalog and knowledge management system, method and article of manufacture which make use of a computer to assist a user in managing massive information.

2. Description of Prior Art

As Internet rises and World Wide Web develops, the Internet prevails all over the world. Not only persons on the Internet double in number but also hundreds of million of registered web sites come to a historic high. This revolutionary web tide accelerates the wheel of knowledge economics era. Almost all of the culture and knowledge of humankind have become deliverable information being widely distributed and readily accessible on the Internet.

However, the widely distributed massive information brings about information anxiety. The main reason lies in that the information is merely a stack of characters or even digital bytes and does not exactly become one's knowledge, if it is not properly arranged, classified and digested by the receiver. Also, there always exist regrets for being incapable of effectively collecting, classifying, and adding value to information so as to form personal knowledge and make further knowledge management after browsing that mass of information. Consequently, although being aware of that knowledge is power and reaching valuable information, most people can not efficiently utilize the information and perform knowledge management.

From the viewpoint of knowledge management, information should be value added, such as being arranged, classified and commented on, in order to transfer the same to become one's useful knowledge and to make further knowledge management. In other words, the objective of knowledge management is to take apart original structure of information and to combine the same with people's intrinsic concepts. And in the end, the information will become real "knowledge" by inspecting the information from various angles based on the intrinsic concepts.

Conventional techniques, however, do not provide sufficient and handy functions of information collection, arrangement and commentary for personal knowledge formation and management, no matter during browsing information on a network via a browser, retrieving information on various databases or from various document files.

Take the functions "Bookmark" and "My Favorite" of browsers as example, although they may record a user's favorite web sites for next visit, they are not specialized in collecting and putting comments on the contents of the web sites. Even if a user downloads information from the target web site to her/his computer via the browser, the user must either save the information in a file, or open an application such as Microsoft Word 2000 to paste previously selected and copied data therein. Consequently, not only the conventional techniques are unhandy in information collection and classification, but also do not provide facilitations in commentary, marking, arrangement, adding value, accessing, browsing and search of the collected information.

In light of the above, it is necessary to provide an effective solution aimed at solving the deficiency of the prior art for facilitating personal catalog and knowledge management.

SUMMARY OF THE INVENTION

For improvement, the present invention provides a system, method and article of manufacture for personal catalog and knowledge management. The main objective is to facilitate digital information collection, classification and commentary. The present invention allows to manage digital information in a way like clipping desirable or useful articles to a scrapbook for further classification and commentary after reading a newspaper or a book. Furthermore, the present invention makes use of digitized information for automatic data preservation, arrangement and search.

A major aspect of the present invention is to collect data including text and images from a visible data source providing information through a data collection module; to generate a classified catalog folder and to put the collected data in the folder for personal catalog management through a data classification module; to comment on and add value to the data through a data commentary module; and to access the collected data and related value-added contents in a storage device through a data access module.

Preferably, the visible data source is an application displaying the information on a display device for a user to browse and providing either a function of drag and drop or a function of copy and paste for another application to retrieve at least a portion of the information. That is, the present invention can be applied to collect information in an application which provides a function of drag and drop or a function of copy and paste and displays information for a user to browse. Particularly, the visible data source is a browser, a database or an opened document file.

Preferably, the data classification module provides the user to generate the classified catalog folder in a default or a user-defined way.

Preferably, the description field selectively further includes a data title field, a data subject field, a data category field, a data keyword field and a data comment field.

Preferably, the data commentary module of the present invention further provides a data origin field for recording origin of the data. The content of the data origin field is user-defined or automatically retrieved from origin data recited in the data source. The data commentary module further provides a data value-added editing function in facilitating editing and commenting on the data.

The present invention further includes a data search module for searching the data collected in the system according to a predetermined searching criterion.

DETAILED DESCRIPTION OF THE INVENTION

Figure 1:
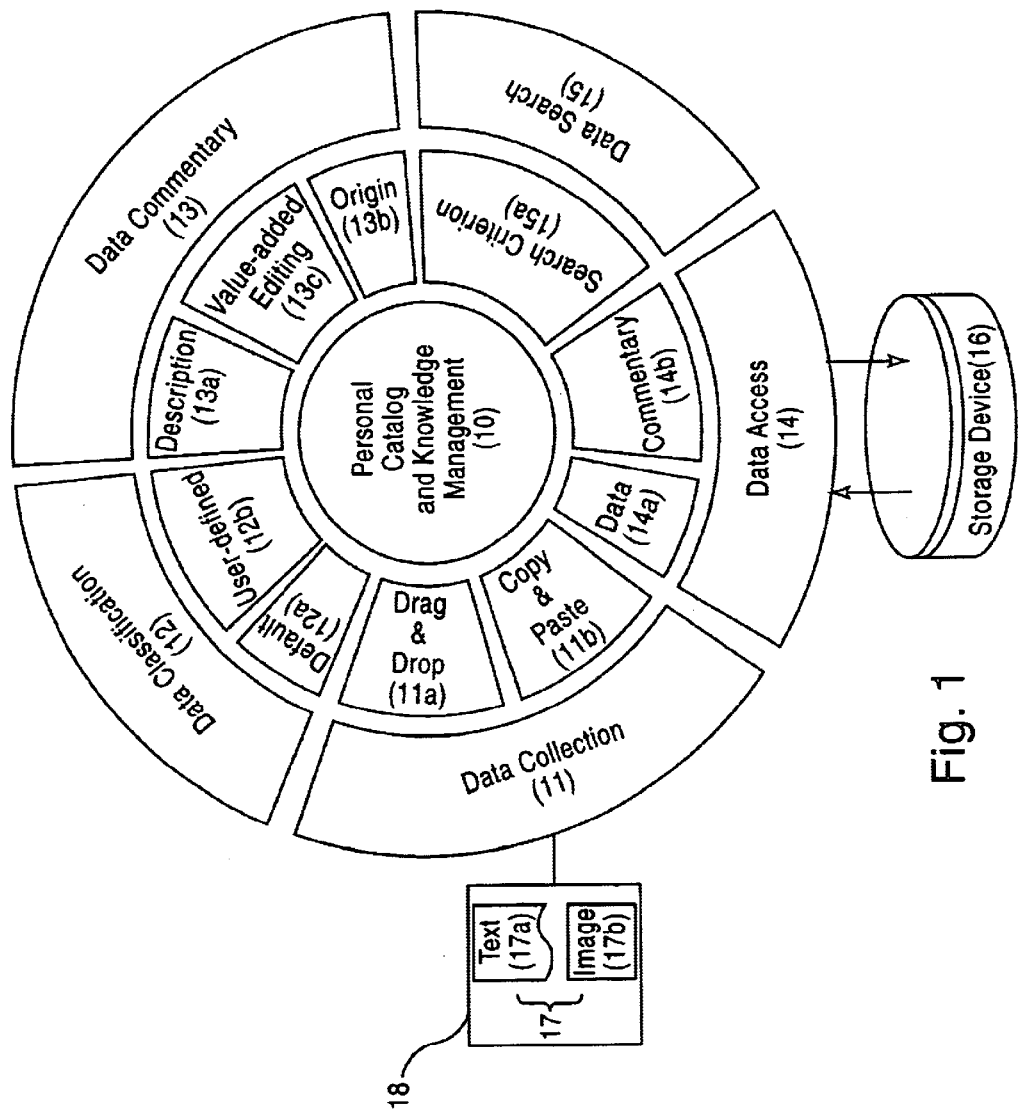
FIG. 1 depicts a fundamental framework of personal catalog and knowledge management of the present invention.

Please refer to FIG. 1, which depicts a fundamental framework of personal catalog and knowledge management of the present invention. In order to solve problems of the prior art and to provide improved utility, the present invention based on the personal catalog and knowledge management 10 develops mechanisms and functions of data collection 11, data classification 12, data commentary 13 and data access 14. Preferably, the personal catalog and knowledge management 10 further includes data search 15.

In the mechanism of data collection 11, the present invention collects data 17, including text 17a and images 17b, from a visible data source 18 which provides information. The visible data source 18 is an application which displays the information on a display device such as a monitor for a user to browse and provides either a function of drag and drop or a function of copy and paste for another application to retrieve at least a portion of the information. That is, the present invention can be applied to collect and to proceed follow-up operations on a display device as the user is browsing information. More specifically, the visible data source 18 includes, but not limited to, a browser, a database or an opened document file. The data collection 11 collects the data 17 from the visible data source 18 in a way of drag and drop 11a or in a way of copy and paste 11b.

In the mechanism of data classification 12, the present invention provides options of default 12a and user-defined 12b functions to create a classified, or referred to as being categorized, catalog folder(shown as a symbol 921 in FIG. 9 hereinafter). The collected data 17 are readily stored in the classified catalog folder 921 for a user in further managing catalog thereof. The implementation of creating the classified catalog folder 921 may be either before or after the step of data collection 11.

In the mechanism of data commentary 13, the present invention provides a fundamental feature, among features of the data collection 11 and data classification 12 in facilitating a user's personal data management, of knowledge management by adding value to the collected data 17. In the data commentary 13, at least a description 13a of the collected data 17 is included and preferably, an origin 13b and a value-added editing 13c of the collected data 17 are respectively included.

In the mechanism of data access 14, collected data 14a, which might be value added or not, and commentary 14b are stored in a storage device 16 and can be retrieved therefrom for data preservation. The storage device 16 refers to a well-known hardware such as a hard disk and a device with broader meaning as well, such as a database for storing data.

Preferably, the personal catalog and knowledge management 10 of the present invention further includes a data search 15 which searches all data based on a search criterion 15a determined by a user.

Figure 2:
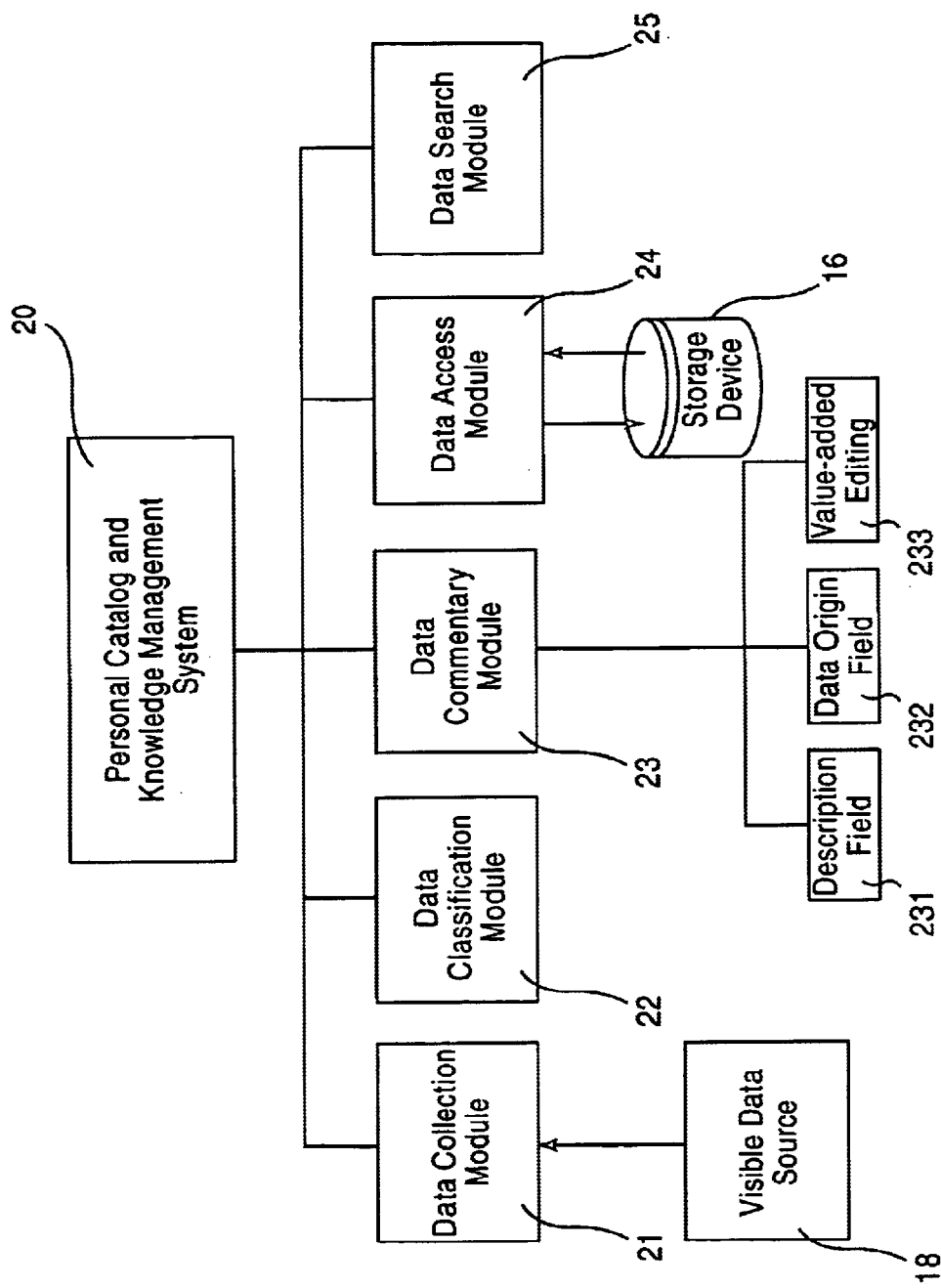
FIG. 2 depicts a composition of the personal catalog and knowledge management system of the present invention.

Next, please refer to FIG. 2 which depicts a composition of the personal catalog and knowledge management system 20 of the present invention. The personal catalog and knowledge management system 20 provides a user to collect, classify and add value to massive information for personal useful knowledge management. The system 20 includes a data collection module 21 which collects data of text and image from a visible data source 18 which provides the information; a data classification module 22 which generates a classified catalog folder for putting the data collected by the data collection module 21 in the folder; a data commentary module 23 which provides a description field 231 for recording description of the data in providing comment on the data so as to add value to the data; and a data access module 24 for accessing the data, the catalog folder and the description in a storage device 16. The basic composition and structure of the system 20 are as described in FIG. 1 and further described in the following.

In the personal catalog and knowledge management system 20 of the present invention, the data classification module 22 provides the user options of user-defined and default functions in generating a classified, or being referred to as categorized, catalog folder for placing the collected data therein. The user can readily find the desired data according to the classified catalog folder.

Although the information seems unlimited in quantity, ways of organizing and arranging the information are limited. Generally, the information is classified and organized according to class, time, place, alphabet or hierarchy. Well-organized information will bring to maximum efficacy. Different ways of classification will result in totally different understanding of the information, which are up to the research subject or expression emphasis. For example, if the research subject is an automobile, the classification can be made according to class, such as a convertible, a sedan and a four-wheel driven car; or according to hierarchy, such as from the cheapest to the most expensive ones. If the research subject is a car sales dealer, the classification can be made according to car sales amounts. Putting the collected massive information into classified catalog folder helps a user to accomplish personal catalog management and therefore to solve problems of information anxiety. The information utilization efficiency can be enhanced and the process of transforming the information into personal knowledge is facilitated.

Figure 9:
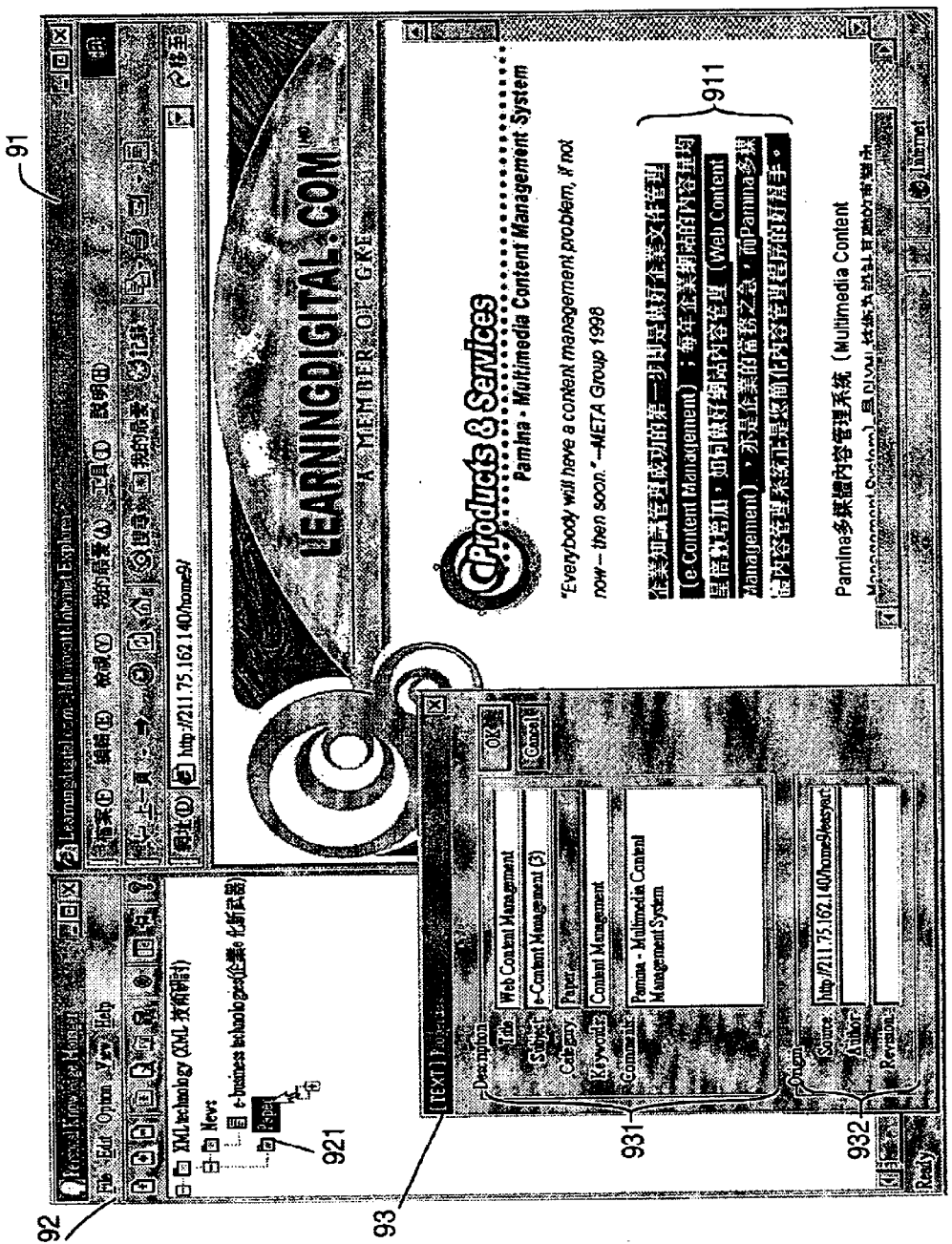
FIG. 9 depicts an operation interface according to a preferred embodiment of the present invention.

In the data commentary module 23, the description field 231 selectively further includes fields of title, subject, category, keyword, and comments (shown as a symbol 931 in FIG. 9). The fields record correlated information of the collected data for providing description of the data. The fields help to categorize the collected data and help to data search and management as well.

The data commentary module 23 further provides an origin field 232 for recording the data source. The origin field 232 helps to trace and record the data for further management. The content of the origin field 232 can be either defined by a user, or retrieved from the source information appended in the data source 18 during a process of the collection module 21 collecting the data. Take the content document of a common web page serving as the data source 18 as example, the document usually contains document source information and the personal catalog and knowledge management system 20 of the present invention, during the data collection module 21 collecting the data 17, will automatically retrieve the document source information and put it to the origin field 232. If the data source 18 does not provide the source information, the system 20 provides a user-defined function for a user to fill in the origin field 232 necessary source information.

Preferably, the origin field 232 includes information of source, author or revision (also shown in a symbol 932 of FIG. 9 hereinafter).

The data commentary module 23 further provides a function of data value-added editing 233 for editing and providing comments on the collected data 17. The collected data 17 are commented so as to enhance value thereof and for utilization convenience in the future. The function of value-added editing 233 includes, but not limited to, changing color of the text 17a, making the text 17a in boldface, italicizing the text 17a, underlining the text 17a, and adding editing text to the collected data 17 (shown in symbols 102 and 103 of FIG. 10 hereinafter). The user can handily browse the collected data 17, edit the collected data 17, and read the collected data 17 and related comments as well.

As shown in FIG. 2, the personal catalog and knowledge management system 20 of the present invention preferably includes a data search module 25 for searching all the data in the system 20 according to a given search criterion 15a. The way of search may be based on title, subject, content, keyword, author, or data source of the data in the system 20. After search, the data which fit the search criterion are listed for a user to click and browse.

Figure 3:
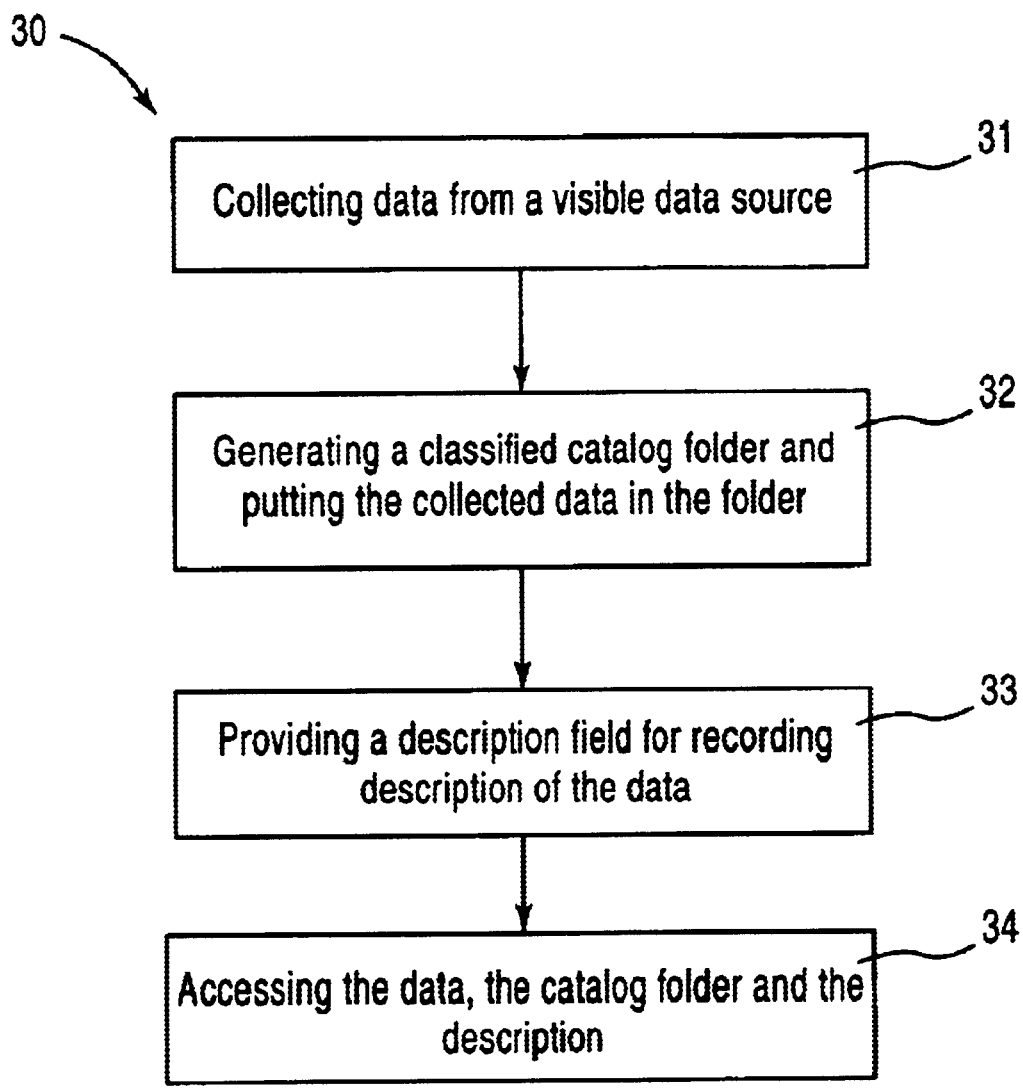
FIG. 3 depicts a step flow chart of the personal catalog and knowledge management method of the present invention.

A step flow chart of the personal catalog and knowledge management method 30 of the present invention is shown in FIG. 3. Firstly, in the data collection step 31, data 17 are collected from a visible data source 18. In the data classification step 32, a classified catalog folder is generated and the collected data 17 in the data collection step 31 is put into the classified catalog folder. In the data commentary step 33, a description field for recording description of the collected data 17 is provided to comment the data 17. And in the data access step 34, the data 17, the catalog folder and the description are accessed in a storage device 16.

Figure 4:
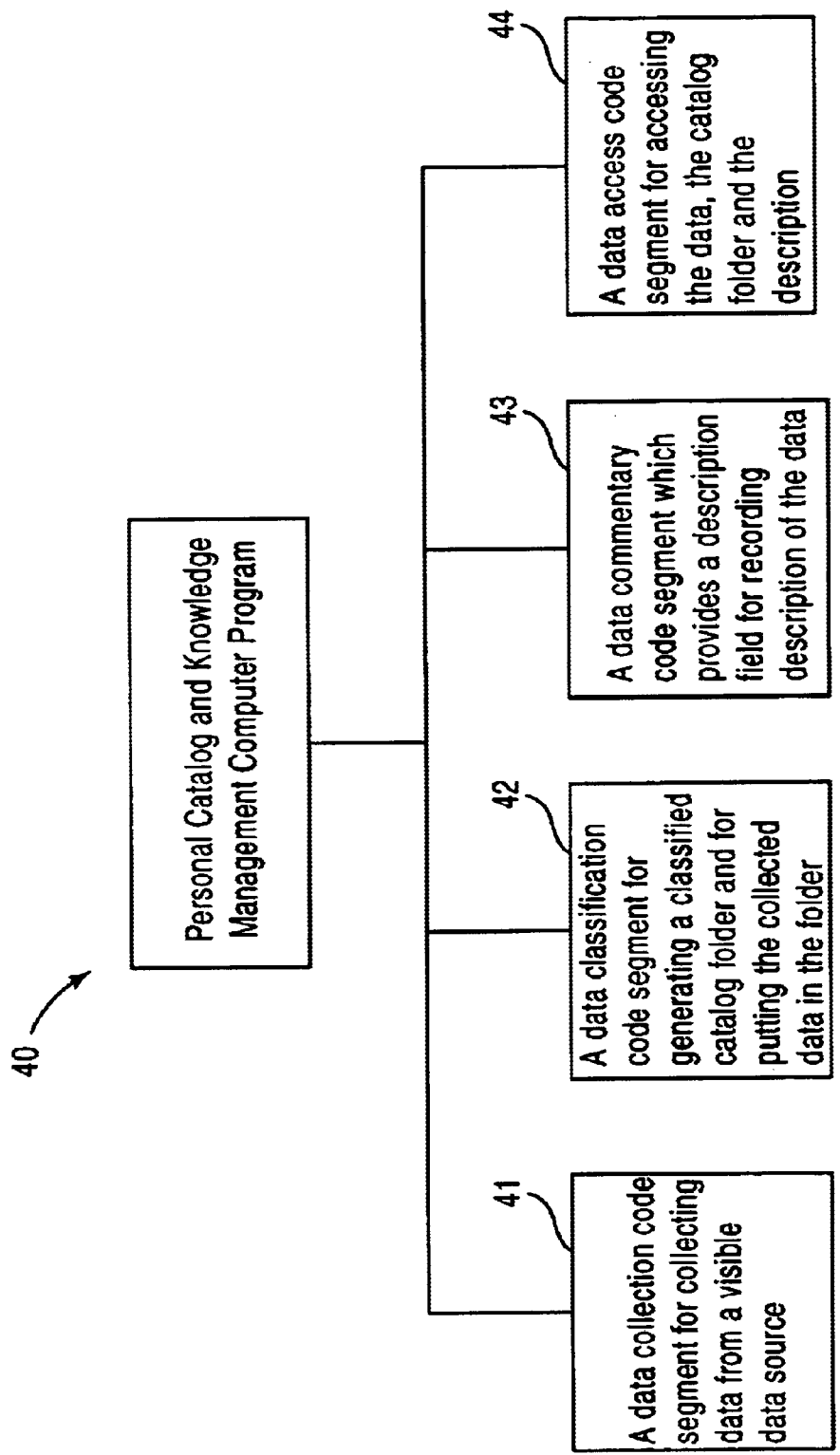
FIG. 4 depicts a composition of the personal catalog and knowledge management computer program of the present invention.

FIG. 4 depicts a composition of the personal catalog and knowledge management computer program 40 of the present invention. In the data collection code segment 41, data 17 are collected from a visible data source 18. In the data classification code segment 42, a classified catalog folder is generated and the collected data 17 are put in the classified catalog folder. In the data commentary code segment 43, a description field for recording description of the data 17 is provided to comment the data 17. And in the data access code segment 44, the data 17, the catalog folder and the description are accessed in a storage device 16.

Next, please refer to FIGS. 5 to 8 for further description of the present invention.

Figure 5:
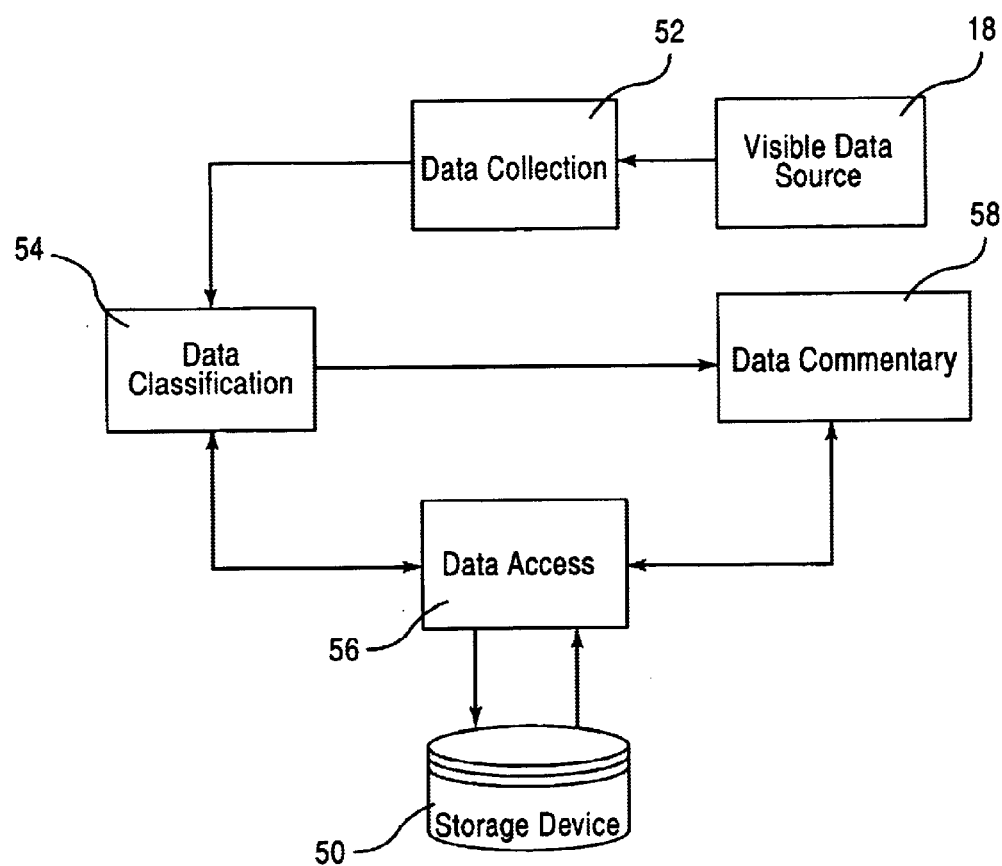
FIG. 5 depicts a relationship of each operation of the present invention.

FIG. 5 depicts a relationship of each operation of the present invention. The data collection 52 collects data from the visible data source 18 and sequentially the data classification 54, data commentary 58 and data access 56 are proceeded for data processing. Further, when stored in a storage device 50, the data can be retrieved therefrom for implementing the operation of data classification 54 or data commentary 58. The data can be edited and reused so as to become more valuable information during the operations.

Figure 6:
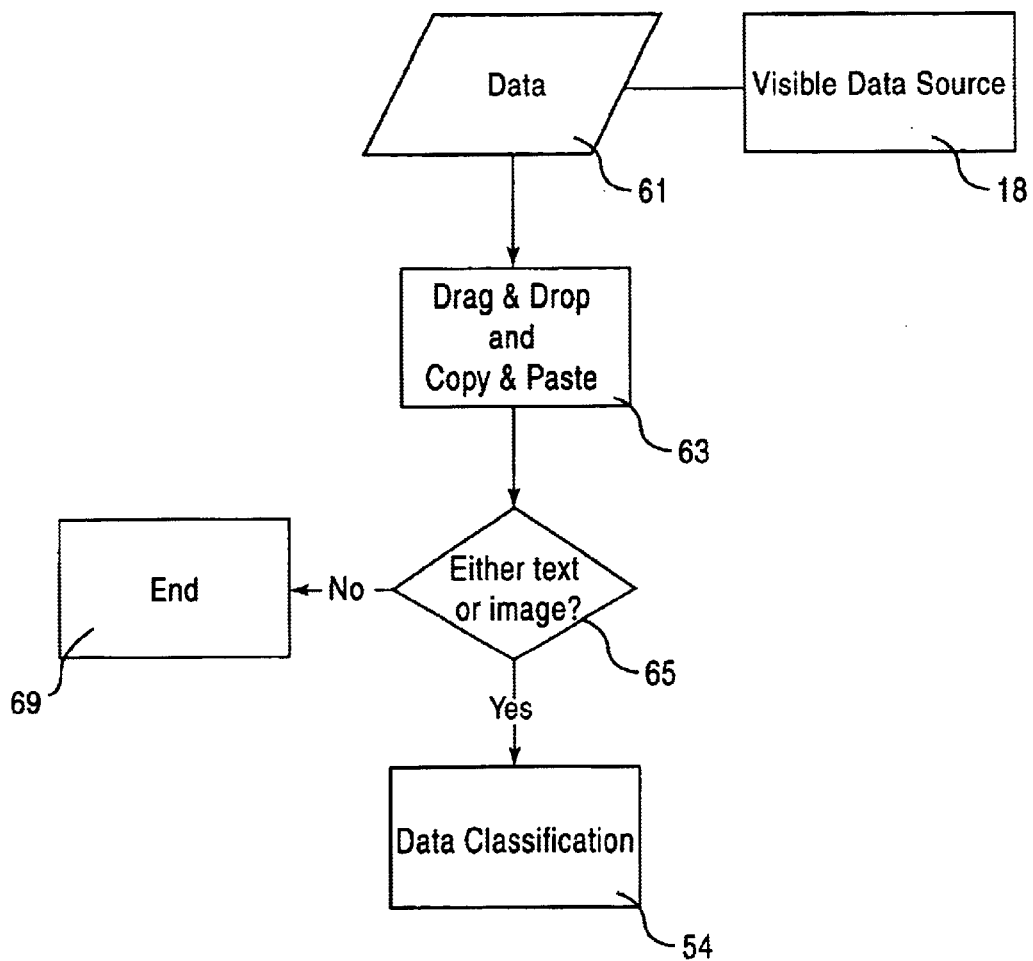
FIG. 6 depicts a data collection flow chart of the present invention.

FIG. 6 depicts a data collection flow chart of the present invention. The desired data 61 are selected from the visible data source 18 which is directly displayed on a display device and then are captured through ways of drag and drop, or copy and paste. A judgment 65 of whether the data 61 are either text or image is made. If the judgment 65 is true, the data 61 are put into a classified folder for data classification 54. If the judgment 65 is not true, the data 61 are not processed and the flow ends 69.

Figure 7:
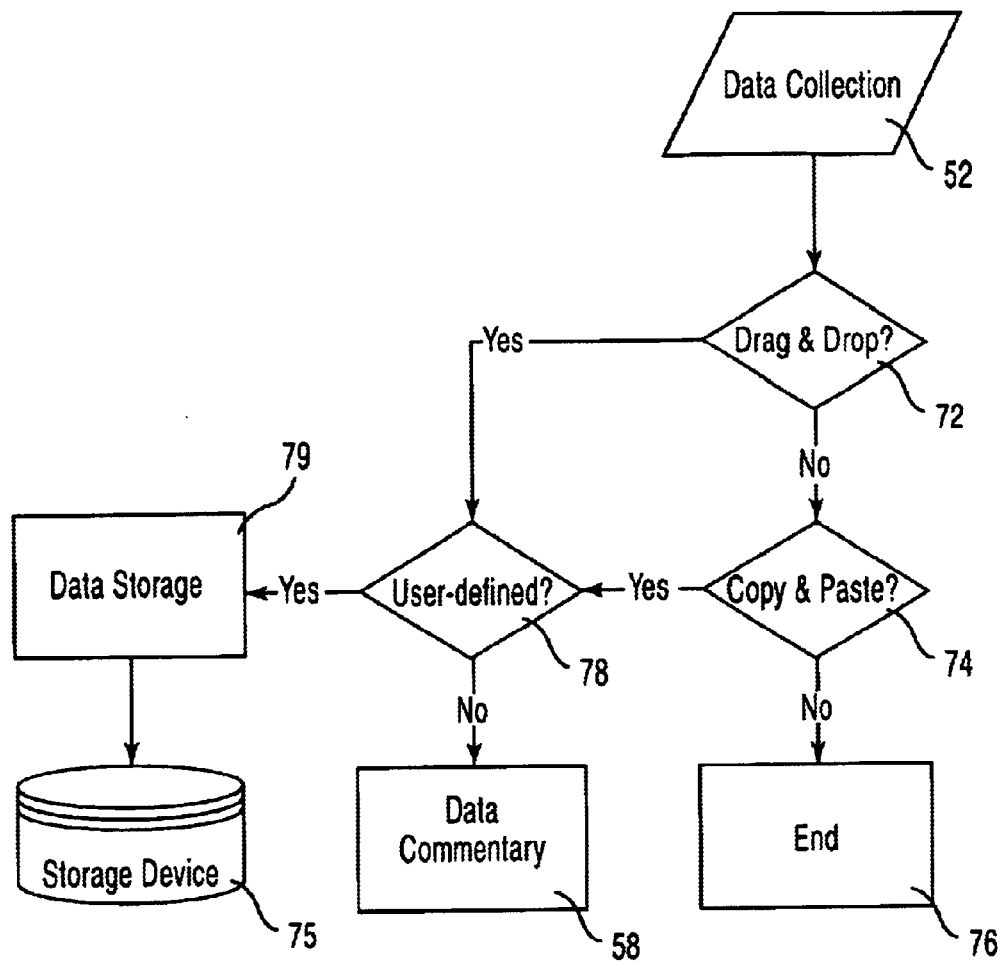
FIG. 7 depicts a relational flow chart of the data collection and data storage and data commentary operations of the present invention.

FIG. 7 depicts a relational flow chart of the operations of data collection 52 and data storage 79 and data commentary 58 according to the present invention. When collected in data collection 52, the data 61 are judged if they are obtained by a way of drag and drop 72. If true, a judgment is made to confirm if the name of the catalog folder is user-defined 78. If it is user-defined, then the data storage 79 is proceeded. If it is not user-defined, then the data commentary 58 is proceeded. Back to the way of data collection 52. If the data 61 are not obtained by a way of drag and drop 72, they are further judged if obtained by a way of copy and paste 74. If the data 61 are not obtained by the way of copy and paste 74, no further process is proceeded and ends 76. If the data 61 are obtained by the way of copy and paste 74, a judgment is also made to check if the name of the catalog folder is user-defined 78. Same as the above, if it is user-defined, then the data storage 79 is proceeded; if it is not user-defined, then the data commentary 58 is proceeded.

Figure 8:
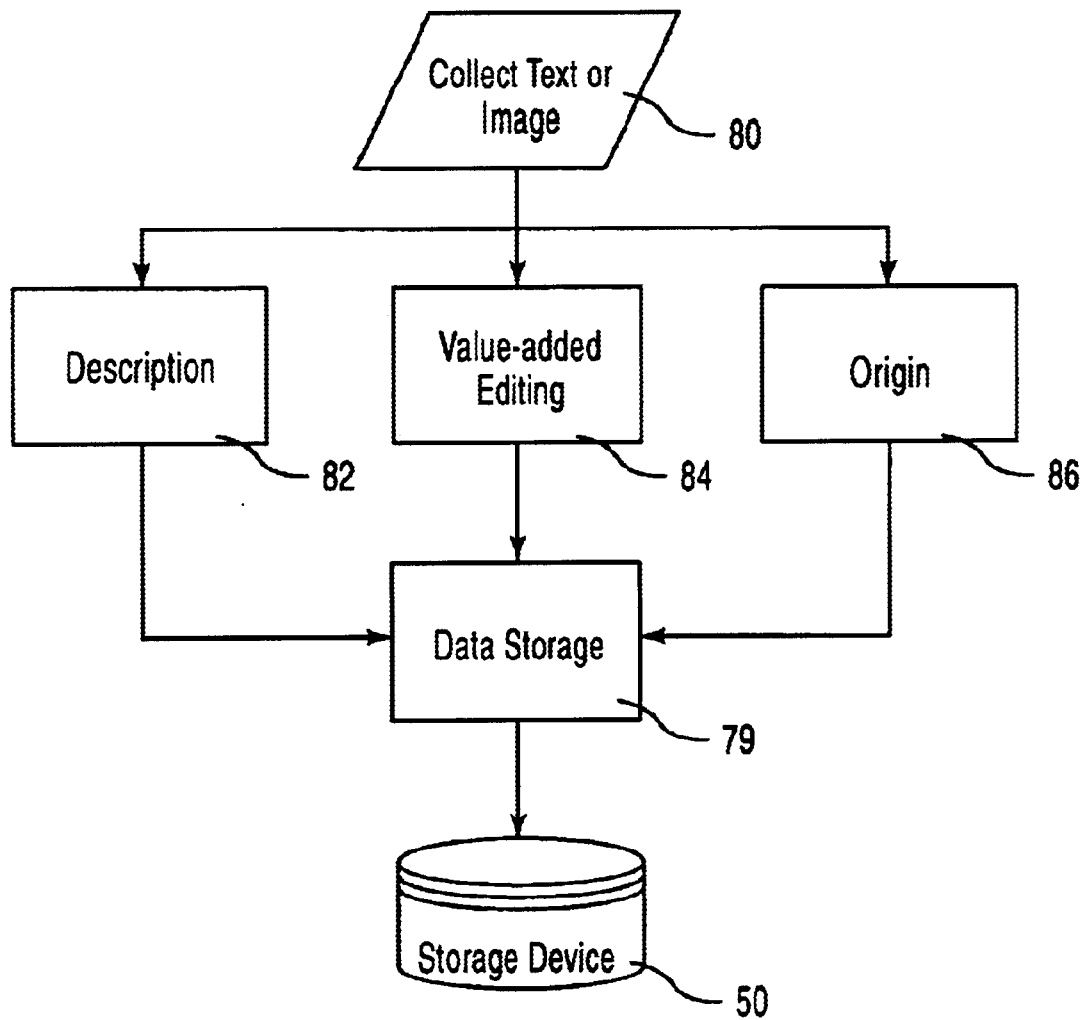
FIG. 8 depicts a data commentary flow chart of the present invention.

FIG. 8 depicts a data commentary flow chart of the present invention. The data commentary 58 collects text or image 80 and then specifies description 82, origin 86 and value-added editing thereof. After data commentary, the data storage 79 proceeds to storage the data 61 in the storage device 50.

EXAMPLE 1

FIG. 9 depicts an operation interface according to a preferred embodiment of the present invention. A visible data source 91, a catalog window 92 and a data commentary window 93 are displayed in a screen of a display device. The visible data source 91 is a browser that connects to a web site and displays one of web pages of the web site. The desired data 911 are included in the visible data source 91.

The catalog window 92 includes at least a catalog folder 921 whose name is defined either by a user or according to a default name. The data commentary window 93 includes a description field 931 and an origin field 932. The description field 931 further includes a title field, a subject field, a category field, a keywords field and a comments field. All of these fields, except the category field, are filled in by the user according to the contents of the collected data 911. The subject field may be filled with the name of the catalog folder 921, in this example e-Content Management is the name of the document and Paper is the name of the catalog folder 921. The category field in this example is not allowed for a user to fill in. The category is defined based on which catalog folder the data being put into. The origin field 932 further includes a source field, an author field and a revision field. The content of the source field, in this example, is automatically retrieved from the hyperlink source data provided by the visible data source 91. The author and revision fields are selectively filled in by the user.

In practical implementation, the user selects the desired data 911 and puts the data 911 by a way of copy and paste, or drag and drop into the catalog folder 921. The data commentary window 93 will show up for the user to fill in each field with commentary and related description of the data 911.

Figure 10:
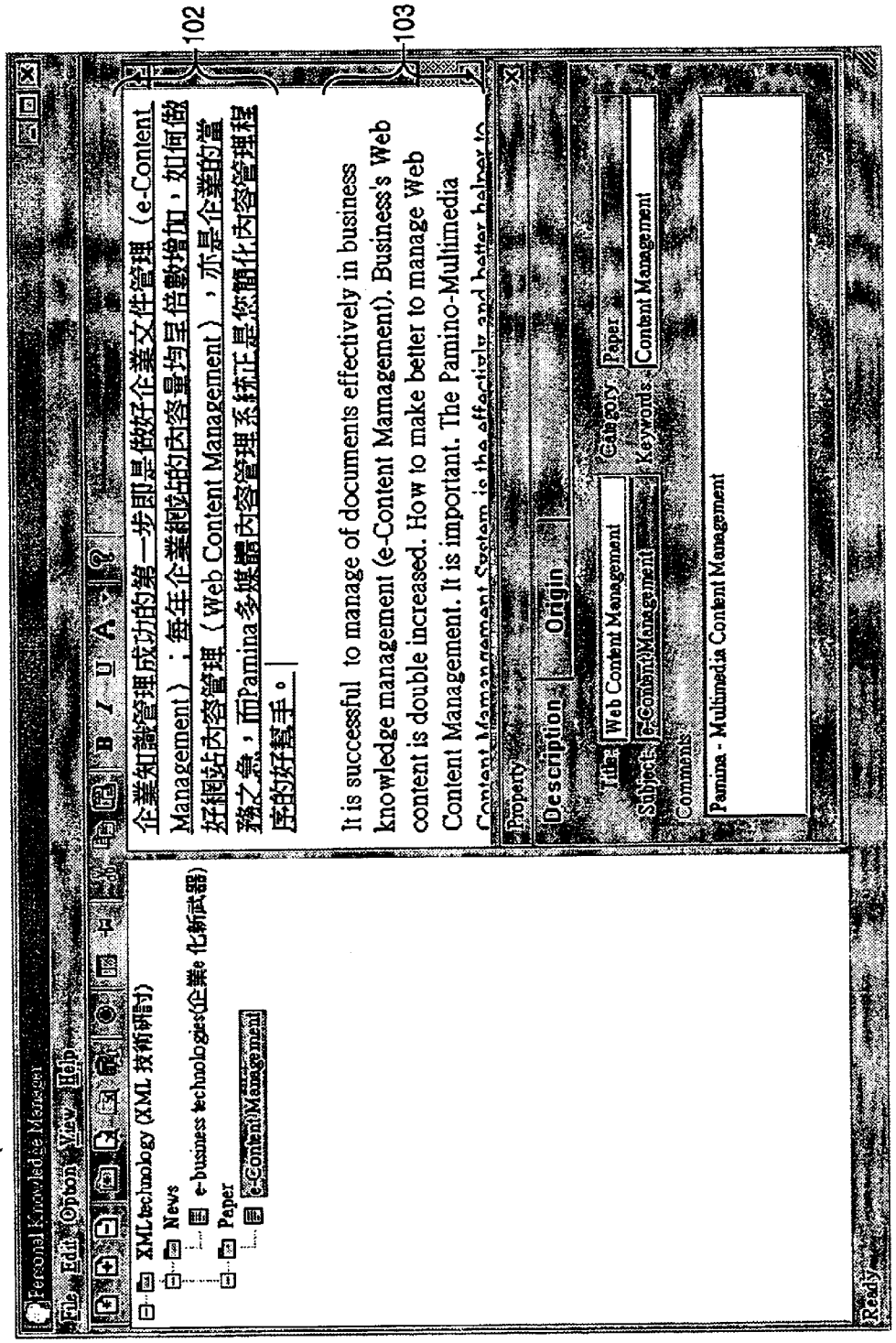
FIG. 10 depicts value-added editing of text data according to the preferred embodiment of the present invention.

FIG. 10 depicts value-added editing of text data according to the preferred embodiment of the present invention. The collected data 911 can be further edited for adding value thereon. FIG. 10 shows a personal catalog and knowledge management window 101 with collected data 102 open. The collected data 911 are underlined and become the underlined data 102. Value-adding commentary 103 is added under the data 102. Whereby, the collected data 911 can be value-added and the knowledge management is facilitated.

EXAMPLE 2

Figure 11:
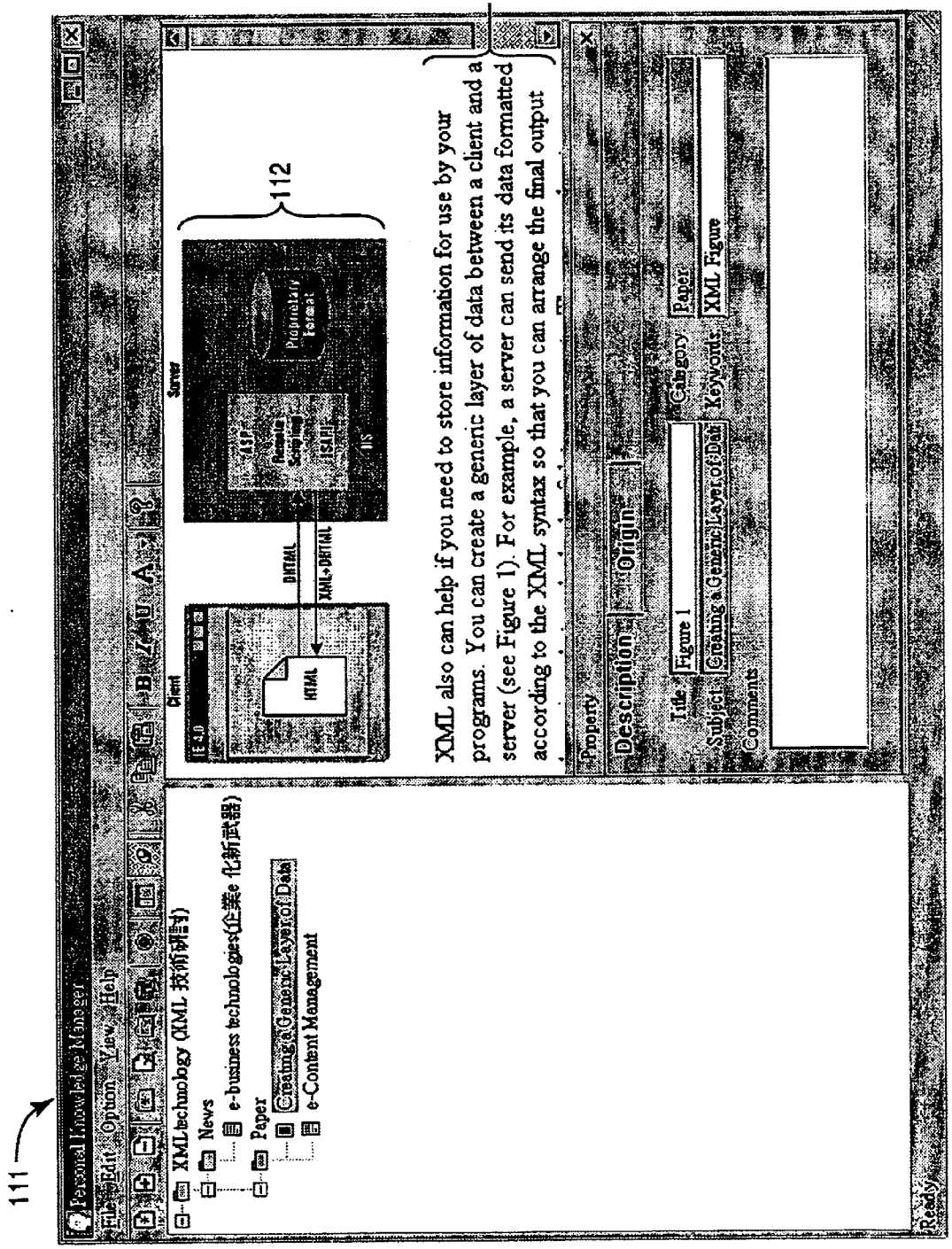
FIG. 11 depicts value-added editing of image data according to another preferred embodiment of the present invention.

The embodiment is substantially the same as the example 1 except that the collected data are image. FIG. 11 depicts value-added editing of image data 112 of a personal catalog and knowledge management window 111. The image data 112 are the collected data and the value-added editing 113 underneath is further commentary and descriptive text for the same. Thus, the collected image data 112 can be flexibly implemented.

EXAMPLE 3

Figure 12:
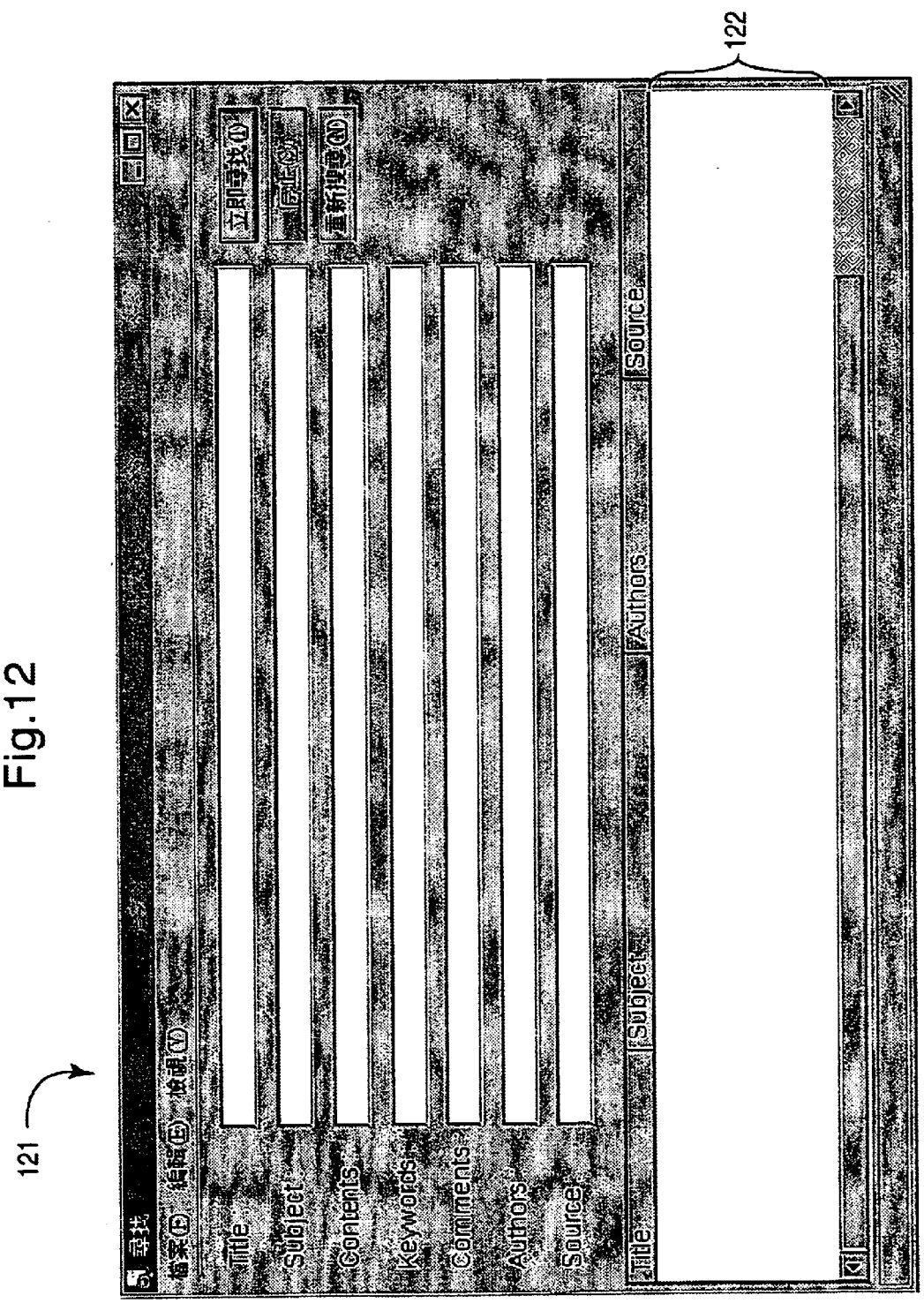
FIG. 12 depicts a data search window according to a further preferred embodiment of the present invention.

The embodiment is substantially the same as the examples 1 and 2 except providing further search on collected data and related commentary. FIG. 12 depicts a data search window 121 of the embodiment. The search can be selectively based on the title, subject, contents, keywords, comments, author and source. The search result is shown below in a search result field 122.

The embodiments and features of the present invention become apparent according to the above detailed description. However, it should be understood that any modifications or changes without departing from the spirit of the invention are intended to be protected in the scope of the present invention.

What is claimed is:

1. A system for personal catalog and knowledge management, providing a user to collect, classify and add value to information for further effective personal knowledge management, the system comprising:
    a data collection module for collecting data which comprise text and images from a visible data source which provides the information;
    a data classification module for generating a classified catalog folder and for putting the collected data in the folder;
    a data commentary module, providing a description field for recording description of the data, the description providing comment on the data; and
    a data access module for accessing the data, the catalog folder and the description.

2. The system of claim 1, wherein the visible data source is an application displaying the information on a display device for the user to browse and providing either a function of drag and drop or a function of copy and paste for another application to retrieve at least a portion of the information.

3. The system of claim 1, wherein the visible data source is a browser, a database or an opened document file.

4. The system of claim 1, wherein the data classification module provides the user to generate the classified catalog folder in a default or a user-defined way.

5. The system of claim 1, wherein the description field selectively further comprises a data title field, a data subject field, a data category field, a data keyword field and a data comment field.

6. The system of claim 1, wherein the data commentary module further provides a data origin field for recording origin of the data.

7. The system of claim 6, wherein the content of the data origin field is user-defined.

8. The system of claim 6, wherein the content of the data origin field is retrieved from origin data recited in the data source during the data collection module collecting the data.

9. The system of claim 1, wherein the data commentary module further provides a data value-added editing function in facilitating editing and commenting on the data.

10. The system of claim 1, further comprising a data search module for searching the data collected in the system according to a predetermined searching criterion.

11. A method for personal catalog and knowledge management, providing a user to collect, classify and add value to information for further effective personal knowledge management, the method comprising the following steps:
    a data collection step, the step collecting data comprising text and images from a visible data source which provides the information;
    a data classification step, the step generating a classified catalog folder and putting the collected data in the folder;
    a data commentary step, the step providing a description field for recording description of the data; and
    a data access step, the step accessing the data, the catalog folder and the description.

12. The method of claim 11, wherein the visible data source is an application displaying the information on a display device for the user to browse and providing either a function of drag and drop or a function of copy and paste for another application to retrieve at least a portion of the information.

13. The method of claim 11, wherein the visible data source is a browser, a database or an opened document file.

14. The method of claim 11, wherein the data classification step provides the user to generate the classified catalog folder in a default or a user-defined way.

15. The method of claim 11, wherein the description field selectively further comprises a data title field, a data subject field, a data category field, a data keyword field and a data comment field.

16. The method of claim 11, wherein the data commentary step further provides a data origin field for recording origin of the data.

17. The method of claim 16, wherein the content of the data origin field is user-defined.

18. The method of claim 16, wherein the content of the data origin field is retrieved from origin data recited in the data source during the data collection step.

19. The method of claim 11, wherein the data commentary step further comprises a data value-added editing step in facilitating editing and commenting on the data.

20. The method of claim 11, further comprising a data search step for searching the data according to a predetermined searching criterion.

21. A computer program embodied on a computer readable medium for personal catalog and knowledge management, providing a user to collect, classify and add value to information for further effective personal knowledge management, the computer program comprising:
    a computer readable data collection code segment for collecting data which comprise text and images from a visible data source which provides the information;
    a computer readable data classification code segment for generating a classified catalog folder and for putting the collected data in the folder;
    a computer readable data commentary code segment, providing a description field for recording description of the data, the description providing comment on the data; and
    a computer readable data access code segment for accessing the data, the catalog folder and the description.

22. The computer program of claim 21, wherein the visible data source is an application displaying the information on a display device for the user to browse and providing either a function of drag and drop or a function of copy and paste for another application to retrieve at least a portion of the information.

23. The computer program of claim 21, wherein the visible data source is a browser, a database or an opened document file.

24. The computer program of claim 21, wherein the data classification code segment provides the user to generate the classified catalog folder in a default or a user-defined way.

25. The computer program of claim 21, wherein the description field selectively further comprises a data title field, a data subject field, a data category field, a data keyword field and a data comment field.

26. The computer program of claim 21, wherein the data commentary code segment further provides a data origin field for recording origin of the data.

27. The computer program of claim 26, wherein the content of the data origin field is user-defined.

28. The computer program of claim 26, wherein the content of the data origin field is retrieved from origin data recited in the data source during the data collection code segment collecting the data.

29. The computer program of claim 21, wherein the data commentary code segment further provides a data value-added editing function in facilitating editing and commenting on the data.

30. The computer program of claim 21, further comprising a data search code segment for searching the data according to a predetermined searching criterion.

* * * * *